United States Patent [19]

Weaver et al.

[11] Patent Number: 4,531,072
[45] Date of Patent: Jul. 23, 1985

[54] SHADED POLE SYNCHRONOUS MOTOR

[75] Inventors: Robert F. Weaver, Indianapolis; Ted G. Proctor, Plainfield, both of Ind.

[73] Assignee: Emhart Industries, Inc., Indianapolis, Ind.

[21] Appl. No.: 481,574

[22] Filed: Apr. 1, 1983

[51] Int. Cl.³ ............................................. H02K 21/00
[52] U.S. Cl. ..................................... 310/162; 310/156; 310/164; 310/172
[58] Field of Search ................. 310/162, 163, 164, 41, 310/172, 49, 156, 40 MM, 194

[56] References Cited

U.S. PATENT DOCUMENTS

| | | | |
|---|---|---|---|
| 2,951,957 | 9/1960 | Eigeman | 310/164 |
| 2,981,855 | 4/1961 | Van Lieshout | 310/172 |
| 3,502,921 | 3/1970 | Suzuki | 310/172 |
| 3,555,323 | 1/1971 | Gerber | 310/162 |
| 3,737,695 | 6/1973 | Kilmer | 310/164 |
| 3,800,175 | 3/1974 | Plotscher | 310/41 |
| 3,808,491 | 4/1974 | Riggs | 310/164 |
| 4,274,024 | 6/1981 | Gottschalk | 310/41 |
| 4,355,252 | 10/1982 | Lechner et al. | 310/172 |
| 4,394,595 | 7/1983 | Weaver | 310/172 |

Primary Examiner—R. Skudy
Attorney, Agent, or Firm—Robert F. Meyer

[57] ABSTRACT

An improvement in the stator structure of a synchronous motor wherein flux generated by a winding produces a magnetic field in the stator structure which in turn causes a rotor to rotate. The stator structure consists of two sets of stator poles intermeshed together. Shading base associated with certain of the stator poles insures that the rotor will start to rotate in a predetermined direction. The running characteristics of the synchronous motor are improved by having one of the sets of stator poles constructed of three different widths and the other set constructed of two different widths. The improved stator structure provides for equal flux distribution within the stator poles causing the motor to run smoothly.

7 Claims, 4 Drawing Figures

4,531,072

SHADED POLE SYNCHRONOUS MOTOR

BACKGROUND OF THE INVENTION

The present invention relates to a synchronous motor and, more particularly, to a synchronous motor having shaded poles to provide a magnetic one-way directional system for the motor and proper positioning of its stator poles to provide good starting and running characteristics.

There is a multitude of applications for small synchronous motors of the type having a permanent magnet rotor. Many of these applications are in timing devices such as clocks and appliances using sequence switches such as automatic washers.

One of the problems associated with synchronous motors having permanent magnet rotors is that the rotors will run in either a clockwise or a counterclockwise direction when current is applied. Thus, the motor drive shaft could be driven in a direction counter to what is desired. The present motor solves this problem by use of shading means for the stator poles to provide a magnetic directional system.

The use of shading means, however, introduces a problem with the motor's running characteristics. More specifically, it is necessary for good, smooth running characteristics that the flux generated by the field coil be equalized between the shaded and unshaded stator poles. The present invention overcomes this problem by using varying pole widths.

OBJECTS OR FEATURES OF THE INVENTION

Accordingly, it is a feature of the present invention to provide a synchronous motor having a magnetic directional system which will insure that the rotor of the motor will start in a predetermined direction. Another feature of the invention is to provide a synchronous motor having varying stator pole widths so as to equalize flux between the shaded and unshaded poles. These and other objects of the invention will become apparent from the following description taken in conjunction with the accompanying drawings.

SUMMARY OF THE INVENTION

Generally speaking, the objects of the invention are accomplished by providing a shaded pole synchronous motor which, in general, comprises an apertured field coil, a permanent magnet rotor positioned in the aperture of the field coil, a plurality of poles about the periphery of the permanent magnet, alternate ones of the poles being of opposite polarity, a first stator including first shaded and unshaded stator poles projecting into the aperture, adjacent the poles of the rotor, the first stator poles being of three different widths and a second stator including second shaded and unshaded stator poles projecting in the aperture adjacent the poles of the rotor and intermeshed with the first stator poles, the second stator poles being of two different widths.

DETAILED DESCRIPTION OF THE DRAWINGS

Figure 1:
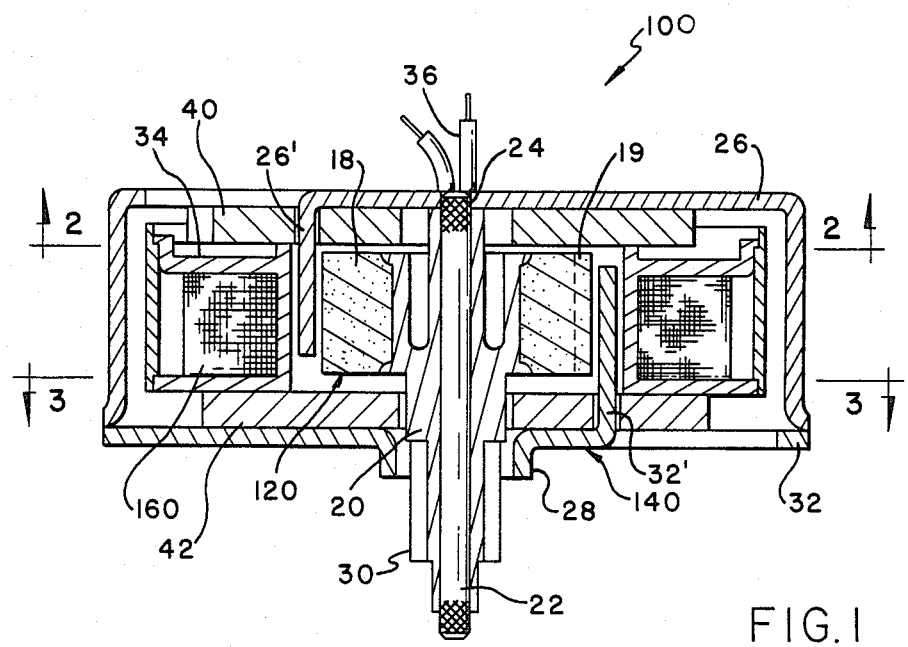
FIG. 1 is a sectional view of a synchronous motor employing the principles of the invention taken along the line 1—1 of FIG. 2.

Referring now to the drawings, the synchronous motor 100 of the present invention generally includes a rotor 120, a stator structure 140 and a winding 160 which applies a magnetic field to the stator structure.

Rotor 120 includes a permanent magnet disc 18 in the shape of a ring and carried by a hub 20 which freely rotates about shaft 22. Shaft 22 is fixedly staked to the bottom 24 of cup-shaped member 26. The permanent magnet disc includes a material of a relatively high energy product ceramic, such as a barium ferrite ceramic magnet with its outer periphery being impressed or magnetized into separate pole segments 19 of alternate north and south polarity. Alternatively, salient poles carried by a separate hub could surround the ring. Hub 20 freely rotates within sleeve 28. The hub includes a pinion 30 which provides the output means of the motor. Stator structure 14 includes cup-shaped member 26 which is closed by bottom plate 32 and poles 26' and 32' which are lanced from the cup-shaped member and the bottom plate respectively. The poles are intermeshed together to form a circle, the circle and the outer rim of the cup-shaped member forming an annulus in which the winding 160 is disposed. The cup-shaped member and the bottom plate 32 may be fabricated from ordinary cold-rolled steel so that magnetic fields may be readily induced in the stator structure.

The winding 160 includes a coil carried by a bobbin 34. Electrical leads 36 which extend through opening 38 of cup-shaped member 26 are used to connect the winding to an alternating current power source.

With the motor described thus far, application of an alternating current to the winding 160 produces a magnetic field in the stator structure which in turn causes rotor 120 to rotate. However, with the arrangement described thus far, the rotor will indiscriminately rotate in either a clockwise or a counterclockwise direction. In accordance with the present invention, a rotational start in a desired direction is insured by the use of shading bars 40 and 42 disposed against the cup-shaped member 26 and plate 32, respectively. The shading bars are composed of a non-magnetic material having a property which allows the flow of electrical current (eddy currents) when exposed to a magnetic field. A suitable material, for example, would be copper. By using this material and by shading or providing a magnetic path completely around predetermined numbers of stator poles, the rotor will start in a predetermined direction.

As previously noted, while the shading bars provide consistent directional starting, they do cause a problem with achieving good, smooth motor running characteristics due to unequal flux distribution with the stator poles. In accordance with the present invention, this problem has been solved by varying the width of the stator poles.

Figure 2:
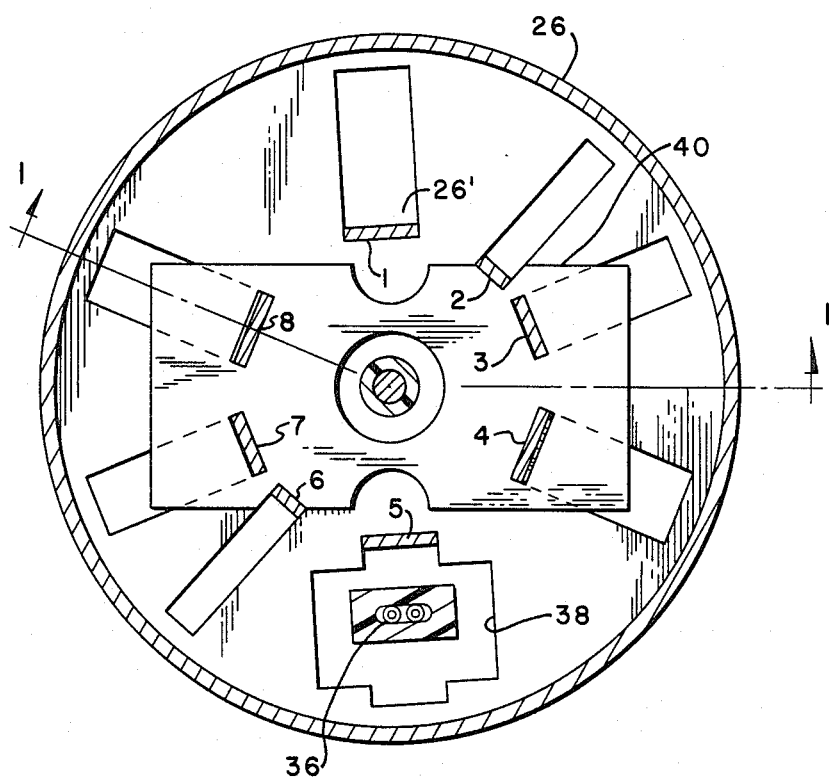
FIG. 2 is a view taken along the line 2—2 of FIG. 1.

Referring to FIG. 2, there are eight stator poles lanced from cup-shaped member 26, numbers 3, 4, 7 and 8 of which are shaded by shading bar 40. As shown, there are three different pole widths within the eight poles. There are two groups of poles of four each (1–4 and 5–8) in which the two outer poles have the same width (1 and 4, 5 and 8) and the two inner poles (2 and 3, 6 and 7) have different widths, both of which are narrower than the outer poles. Or as another way of identifying the poles, there are pairs around a circle of poles of different widths; that is 1 and 2, 3 and 4, 5 and 6 and 7 and 8.

Figure 3:
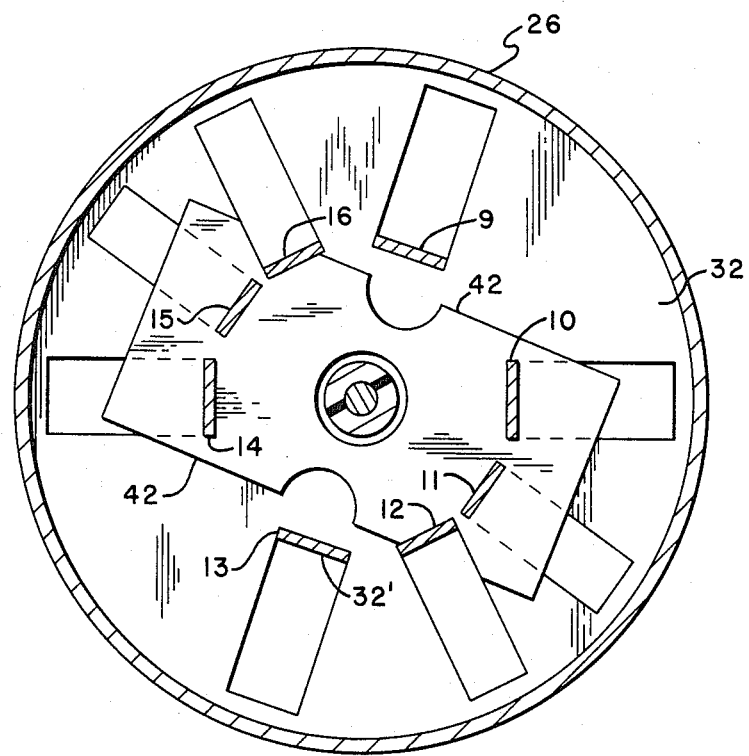
FIG. 3 is a view taken along the line 3—3 of FIG. 1.

Referring to FIG. 3, there are eight stator poles lanced from plate 32, numbers 10, 11, 14, and 15 of which are shaded by shading bar 42. As shown, there are two different widths of pole within the eight poles. There are two groups of four poles each (9–12 and 13–16) the outer poles (9 and 12, 13 and 16) of each being of the same width with the inner poles (10 and 11, 14 and 15) being of the same width but narrower than the outer. Or as another way of identifying the poles, they are arranged in pairs of different widths; that is 9 and 10, 11 and 12, 13 and 14, and 15 and 16.

With these pole widths, it has been found that the flux generated by the field coil is equalized between the shaded and unshaded poles when the poles are meshed together.

Figure 4:
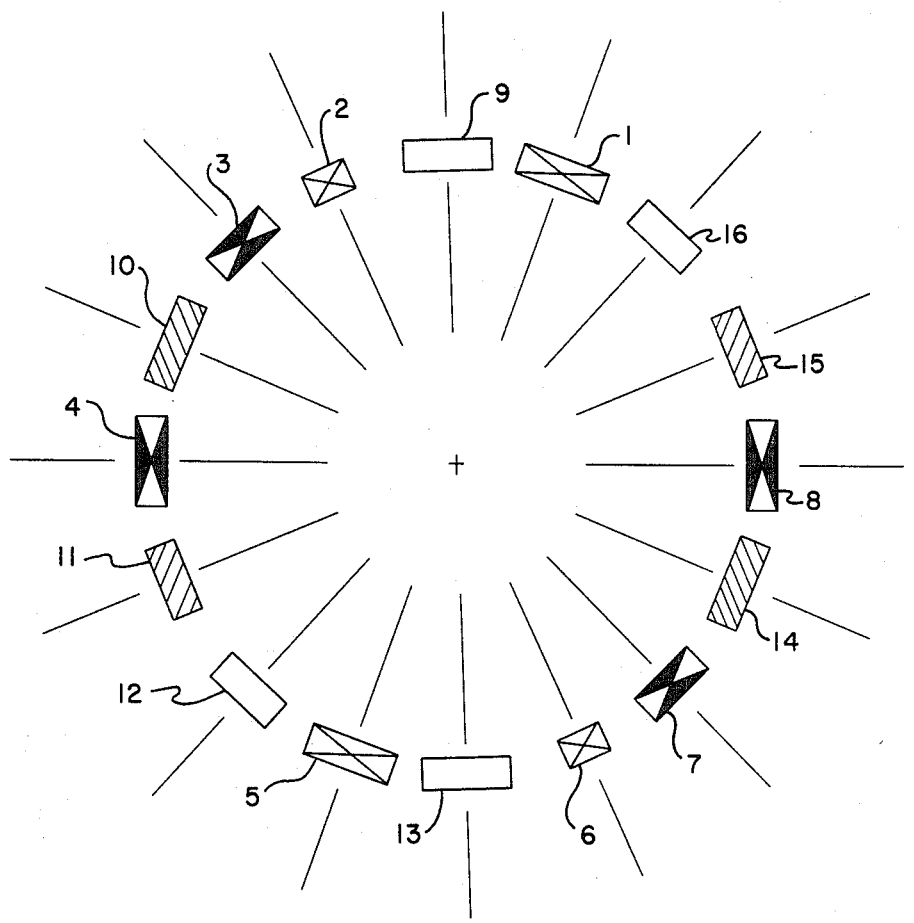
FIG. 4 is a schematic showing the stator poles intermeshed.

Referring to FIG. 4, the relationship of the stator poles when they are intermeshed can be shown. When intermeshed, the shaded and unshaded poles are arranged in four groups of poles (1, 9, 2 and 3; 10, 4, 11 and 12; 5, 13, 6 and 7; 14, 8, 15 and 16) with the outer poles of each group being of the same stator member and the two middle poles being of different stator members. Thus in the 1, 9, 2 and 3 group, the outer poles are poles lanced from field plates 32 while the two inner poles are lanced from field plate 32 and cup-shaped member 26. Or as another way of identifying the poles, viewed clockwise, the first pole of a group is of one stator member, the second pole is of the other stator member, and the third and fourth poles are the same as the first pole.

As shown in the embodiment of FIG. 4, the motor will start and rotate in a counterclockwise direction when viewed looking at the drawings. With the present stator pole arrangement, a clockwise motion can be achieved merely by providing a mirror image of that of FIG. 4; that is arranging the poles such that the position of all the poles, excepting poles 1 and 5, are reversed. More specifically, the position of poles 9 and 16 would be reversed, poles 2 and 15 would be reversed, etc.

What is claimed is:

1. A shaded pole synchronous motor comprising an apertured field coil,
a permanent magnet rotor positioned in said aperture of said field coil, a plurality of poles about the periphery of said permanent magnet, alternate ones of said poles being of one polarity and the remaining poles being of an opposite polarity, and
a first stator member including first shaded and unshaded stator poles projecting into said aperture adjacent said poles of the rotor, said first shaded and unshaded stator poles being of three different widths, a second stator member including second shaded and unshaded stator poles projecting into said aperture adjacent said poles of the rotor and intermeshed with said first stator poles, the second shaded and unshaded stator poles being of two different widths.

2. A shaded pole synchronous motor according to claim 1 wherein said first shaded and unshaded stator poles are arranged around a circle in pairs, the individual poles of which are of different widths.

3. A shaded pole synchronous motor according to claim 1 wherein said second shaded and unshaded stator poles are arranged around a circle in pairs, the individual poles of which are of different widths.

4. A shaded pole synchronous motor according to claim 1 wherein said first stator member is a cup and said said second stator member is a plate.

5. A shaded pole synchronous motor according to claim 1 wherein, when intermeshed, said first and second shaded and unshaded poles are arranged, clockwise, in four groups of four poles, the outer poles of each group being of one stator member and the middle poles of each group being of different stator members.

6. A shaded pole synchronous motor according to claim 5 wherein said first and second poles in each of said groups are arranged with the first, third and fourth poles being of one stator member, and the second pole being of the other stator member.

7. A shaded pole synchronous motor comprising:
an apertured field coil,
a permanent magnet rotor positioned in said aperture of said field coil, a plurality of poles about the periphery of said permanent magnet, alternate ones of said poles being of one polarity and the remaining poles being of an opposite polarity,
a stator cup including first shaded and unshaded poles projecting into said aperture in a circle adjacent said poles of said rotor, there being two groups of four poles, the two outer poles of each group being of the same width, and the two inner poles of each group being of different widths that are less than the width of the two outer poles, and
a stator plate including second shaded and unshaded poles projecting into said aperture and intermeshing with said first shaded and unshaded poles, there being two groups of four poles, the outer two poles of each group being of the same width and the inner two poles of each group being of the same width that is less than the width of the outer two poles.

* * * * *